United States Patent
Unger et al.

(10) Patent No.: US 7,545,939 B2
(45) Date of Patent: Jun. 9, 2009

(54) CONTROL 3 SIGNAL SYNTHESIS

(75) Inventors: Robert Allan Unger, El Cajon, CA (US); Mark Champion, Kenmore, WA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 404 days.

(21) Appl. No.: 11/214,097

(22) Filed: Aug. 29, 2005

(65) Prior Publication Data

US 2007/0064941 A1     Mar. 22, 2007

(51) Int. Cl.
*H04N 7/167* (2006.01)
(52) U.S. Cl. ...................................... 380/225
(58) Field of Classification Search ............. None
See application file for complete search history.

(56) References Cited

U.S. PATENT DOCUMENTS

| | | | | |
|---|---|---|---|---|
| 6,021,385 A * | 2/2000 | Jarvinen et al. | 704/219 |
| 6,075,829 A * | 6/2000 | Hayashi et al. | 375/344 |
| 6,445,686 B1 * | 9/2002 | Hoffbeck et al. | 370/318 |
| 7,124,349 B2 * | 10/2006 | Barrett et al. | 714/776 |
| 2001/0055319 A1 * | 12/2001 | Quigley et al. | 370/480 |
| 2003/0145336 A1 | 7/2003 | Matsuzaki et al. | |
| 2004/0217948 A1 | 11/2004 | Kawasaki et al. | |
| 2004/0250273 A1 | 12/2004 | Swix et al. | |
| 2005/0136990 A1 | 6/2005 | Hardacker et al. | |
| 2005/0198528 A1 | 9/2005 | Unger | |

OTHER PUBLICATIONS

Digital Visual Interface FAQ, Mar. 2003, Texas Instruments (Application Note), pp. 2-3.*
"High-bandwidth Digital Content Protection System", Digital Content Protection LLC-Revision 1.1, pp. 31-37, Jun. 9, 2003. copyright Intel Corporation, 1999-2003.
"HDCP: What It Is and How to Use It", pp. 73-81, Jim Lyle, Silicon Image, Inc.—EDN—Apr. 18, 2002.

* cited by examiner

*Primary Examiner*—Emmanuel L Moise
*Assistant Examiner*—Nadia Khoshnoodi
(74) *Attorney, Agent, or Firm*—Miller Patent Services; Jerry A. Miller

(57) ABSTRACT

A method consistent with certain embodiments, of processing a received encrypted frame signal, wherein the received encrypted frame signal is indicative that a specific video frame is encrypted, involves receiving a video signal including the received encrypted frame signal; wherein the received video signal comprises a received bit stream; synthesizing the received encrypted frame signal to produce a synthesized encrypted frame signal that is in synchronization with the received encrypted frame signal; determining if a sink wireless receiver is locked to the received bit stream, and if so, passing the received encrypted frame signal to the sink device; and if the sink wireless receiver is not locked to the received bit stream, passing the synthesized encrypted frame signal to the sink device. This abstract is not to be considered limiting, since other embodiments may deviate from the features described in this abstract.

23 Claims, 4 Drawing Sheets

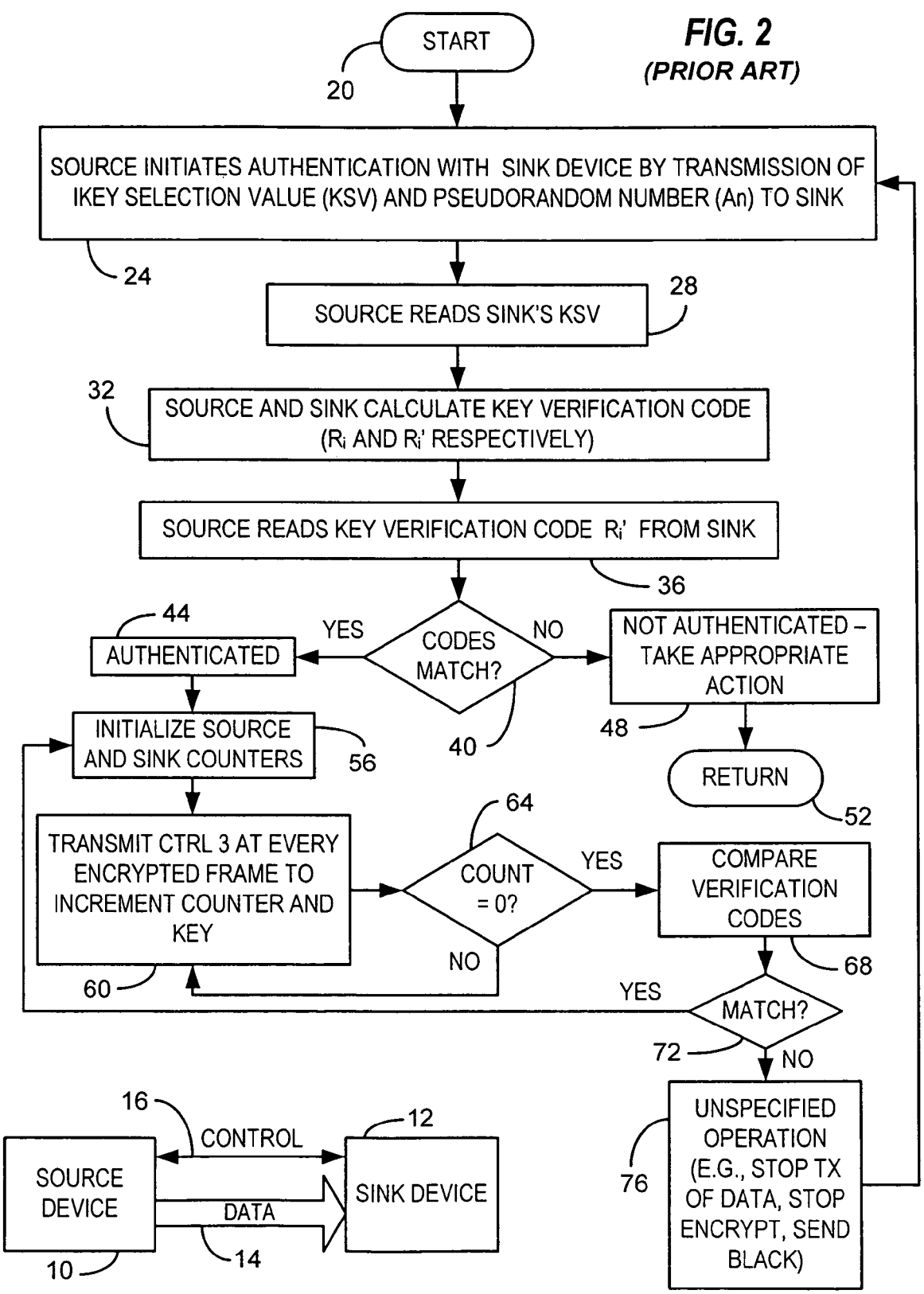

CONTROL 3 SIGNAL SYNTHESIS

BACKGROUND

In the HDCP (High-Bandwidth Digital Content Protection) protocol used in HDMI (High Definition Multimedia Interface) and DVI (Digital Video Interface), an encrypted frame signal referred to as Control 3 (CTL 3, or CTRL 3) is used to indicate that a frame of video is encrypted. The CTRL 3 signal appears during the vertical synchronization interval. CTRL 3 is transmitted by a source device to a sink device to signal that the associated frame is encrypted. When the sink device receives CTRL 3, it increments a counter that is used to establish a new decryption key for the received frame. A similar counter is incremented at the video source and the encryption key is similarly incremented. Periodically, the source checks to see that the sink device is synchronized. If not, an authentication process is carried out. This is the same authentication process used when communication between a source device and a sink device is first initiated.

If the CTRL 3 signal is not received at the sink, the source and sink counters will be mismatched, potentially resulting in unintelligible video decoding and unpredictable screen images (snow, black screen, etc). Every 128 frames (approximately every two seconds) the source verifies that the sink is correctly synchronized. When an unsynchronized situation is detected, the devices re-authenticate to establish synchronization.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 1 is an illustration of a hard wired DVI or HDMI interface using HDCP.

FIG. 2 is a flow chart describing operation of a more or less conventional DVI or HDMI interface using HDCP.

DETAILED DESCRIPTION

Figure 3:
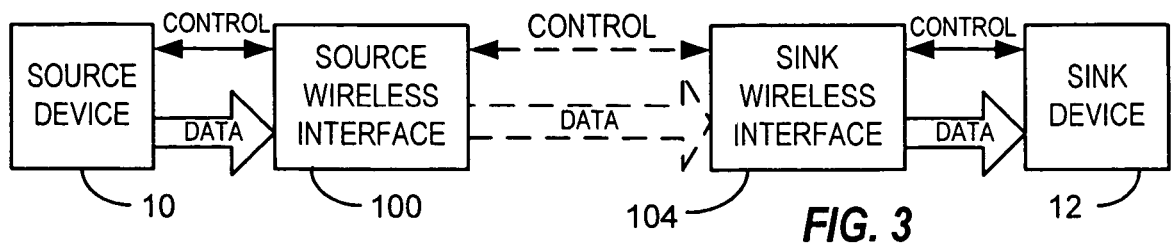
FIG. 3 is a block diagram depicting a wireless adaptation of HDCP consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "encrypted frame signal" is intended to embrace HDCP (High-Bandwidth Digital Content Protection) Control 3 signals (CTL 3, or CTRL 3) or any other signals used to serve a similar purpose in video transmission systems including those that do not explicitly used HDCP. Specifically, such signal is indicative that a specific frame or frames is encrypted. This signal, in HDCP, is also used to increment counters that determine encryption and decryption keys. Moreover, the term CTL 3, CTRL 3, and encrypted frame signal pulses can be used interchangeably herein and can be interpreted generically regardless of which term is used.

In reference to phase locked loops and digital simulations of phase locked loops (which will be considered synonymous herein), the terms "short acquisition time" with respect to a stream of input pulses means a small number of input pulses (e.g., acquisition of lock that is faster than self acquisition in a first order loop). This term also can refer to any synthesizer having aided acquisition. The term "long hold time" is with respect to a period of a stream of pulses, i.e., meaning a large number of pulses (e.g., greater than ten to twenty—or otherwise long time periods in which the output can free run without further input).

Reference throughout this document to "one embodiment", "certain embodiments", "an embodiment", "another embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

HDCP is a specification developed by Intel Corporation for protecting digital entertainment content that traverses DVI (Digital Video Interface) and HDMI interfaces. This specification calls for the encryption of transmissions of digital video content from a source device such as 10 of FIG. 1 to a sink device such as 12. The source device 10 is an intelligent source of digital video content which provides the content in encrypted frames to sink device 12 over data path 14. Control signals 16 are also exchanged between the intelligent source device 10 and the relatively dumb sink device 12. The HDCP specification presumes a hardwired connection between source device 10 and sink device 12, and in fact, specifies continuity testing between the two devices.

FIG. 2 depicts the operation of one aspect of HDCP when utilized between a source device 10 and an associated hard-wired sink device 12 starting at 20. In order to carry out communication between the source device 10 and the sink device 12, an authentication process is carried out starting at 24 where the source device initiates the authentication by transmission of a key selection value KSV, and a pseudorandom number $A_n$ to the sink device 12. The source device 10 then reads the sink device 12's key selection value at 28. Both the source device 10 and the sink device 12 calculate a key verification code $R_i$ and $R_i'$ respectively at 32. The source device then reads verification code $R_i'$ from the sink device 12 to determine whether or not the sink device is authenticated at 36. If the two key verification codes $R_i$ and $R_i'$ match at 40, then authentication is deemed to have occurred at 44. However, if the two codes do not match at 40, the sink device is deemed not authenticated and some other appropriate action is taken at 48 and the process returns at 52.

If the sink device 12 is deemed to have been authenticated at 44, a counter is initialized at both the source device 10 and the sink device 12. In accordance with the Intel HDCP specification, the counters are modulo 128 counters. These counters are initialized at 56. At this point, transmission of video data between the source device 10 and the sink device 12 begins. In HDCP, the video is encrypted on a frame-by-frame basis with a new key calculated for each frame. The counters which are initialized at 56 are incremented at each frame so that a new key is used for encryption at the source device 10 and de-encryption at sink device 12 for each frame. Each encrypted frame is signaled by a signal known as CTRL 3 (as described above) which is provided by the source device 10 to the sink device 12 in the data path 14. This CTRL 3 signal which is transmitted at 60 signals the sink device 12 to increment its counter by one so that the sink device 12 will know which de-encryption key to use for decrypting the video frame.

When the modulo 128 counters reach the end of their count (i.e. the count equals 0 or 128 or 127 or some other specified number) at 64, the source device checks to see that the key verification codes are equal at 68. If a match is obtained at 72 between the two key verification codes (one at the source device 10 and the other at the sink device 12), and the process continues for the next 128 frames (which equals approximately 2 seconds of video). The counters are not explicitly reset except during authentication, but by design they roll over to zero simultaneously so long as no CTRL 3 signal is dropped. However, if a match is not obtained between the source key verification code and the sink key verification code at 72, both the source and the sink devices 10 and 12 can enter an unspecified area of operation at 76. For example, the source device can simply stop transmission at that point until after a new authentication process can be carried out starting at 24, or the source device can transmit black screen or blue screen data until the authentication process can be completed.

Different devices from different manufacturers operate differently when there is an error in transmission or reception of the CTRL 3 signal. While this is a rare occurrence in a hardwired environment such as DVI and HDMI was designed to accommodate, when DVI or HDMI is extended to wireless interfaces between the source device 10 and the sink device 12, the result can be unpredictable. Often, as much as several seconds of video loss can be encountered each time a single CTRL 3 signal is interrupted or disrupted and re-authentication is required. For most, this presents an undesirable video experience.

In accordance with certain embodiments consistent with the present invention, DVI or HDMI or similar protocol is adapted to a wireless environment where the transmission of a continuous stream of CTRL 3 pulses cannot necessarily be guaranteed. In this environment, as depicted in FIG. 3, a source device 10 similar to the previous source device 10 is interfaced to a sink device 12, similar to the prior sink device 12, using a source wireless interface 100 and a sink wireless interface 104 respectively. Such interfaces can operate either as an integral part of source device 10 and sink device 12 respectively or be realized as a pair of separate adapters 100 and 104. Such wireless interfaces can operate, for example, at the 60 Ghz wireless band or using any other suitable wireless frequency spectrum including infrared or other wireless technologies.

Figure 4:
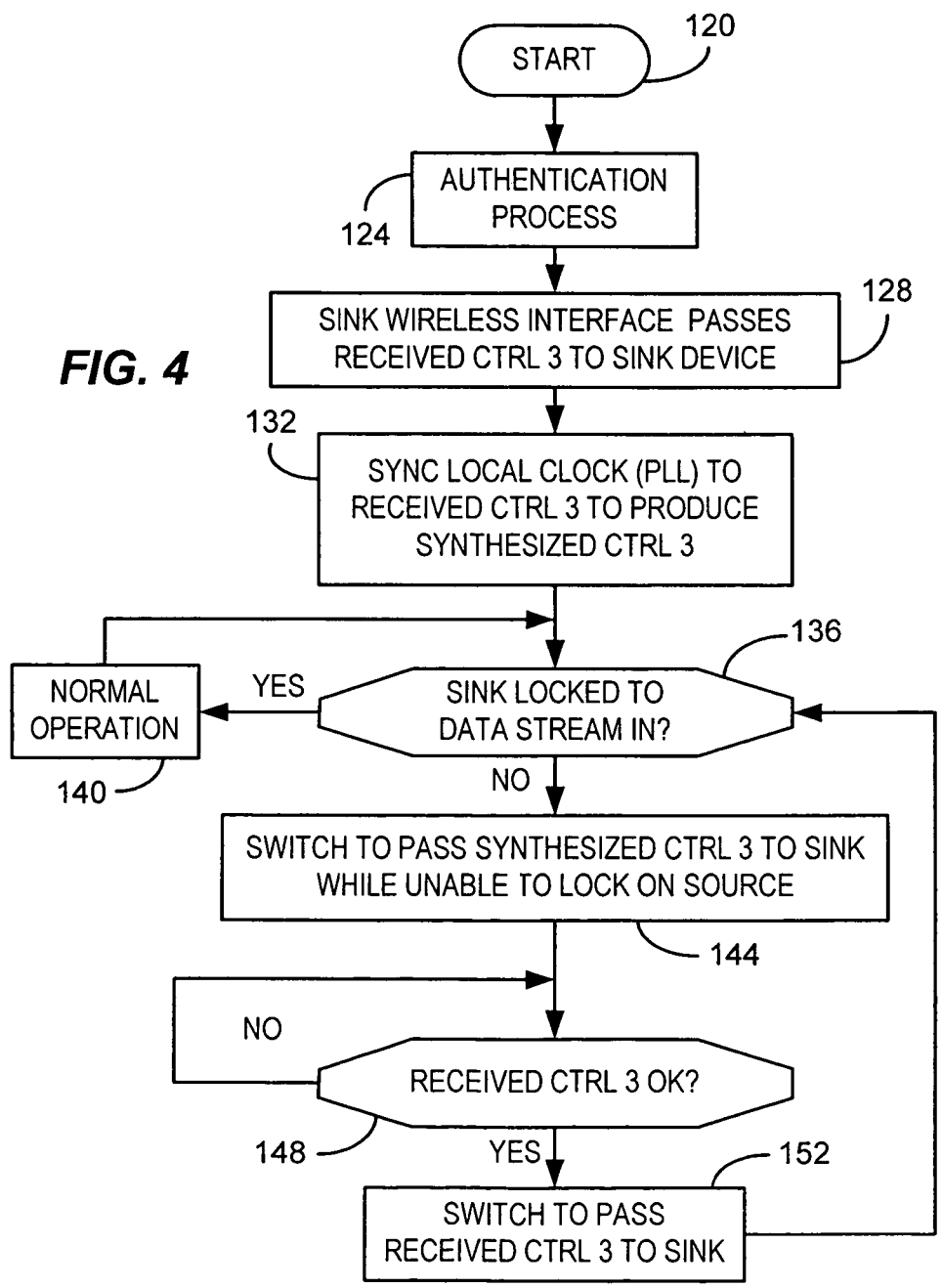
FIG. 4 is a flow chart depicting operation of a first process consistent with certain embodiments of the present invention.

In using such wireless technology, the video transmission becomes more susceptible to loss of one or more CTRL 3 signals during the transmission. As previously noted, this causes the transmitter and receiver key counters to desynchronize and can result in substantial intervals of lost video once the counters lose synchronization. One process for alleviating this potential problem is shown in FIG. 4 starting at 120. It is helpful to view FIG. 5 in conjunction with FIG. 4 during this discussion. An authentication process, much as previously described, can be carried out between the source device and sink device with transmissions between the source wireless interface 100 and sink wireless interface 104 carrying out the communication of key selection values, pseudo-random numbers and key verification codes respectively using any suitable communication protocol at 124. Once the sink device 12 and source device 10 have completed the authentication process at 124, the sink wireless interface 104 begins passing video data along with the received CTRL 3 signal to the sink device 12 at 128. At sink wireless interface 104, a local clock (for example a phase-locked loop 174 or similar) is locked to the received CTRL 3 signal to produce a synthesized CTRL 3 signal at 132.

A wireless receiver 170 (See FIG. 5) of the sink wireless interface 104 is continuously processing the incoming signal and can detect loss of carrier or other failures and can thereby determine that the receiver 170 is no longer locked onto a viable signal.

At this point, it should be noted that the CTRL 3 signals are transmitted at a relatively low data rate from the source device to the sink device compared with the video data that is transmitted in conjunction with the CTRL 3 information. Accordingly, the sink wireless interface 104 can readily determine, by using error measurements and other measures of the signal quality being received, whether or not the sink wireless interface is synchronized with the source wireless interface 100. Thus, the sink wireless interface 104 can continually monitor the status of the incoming data and determine whether or not the received bit stream is locked to the transmitted bit stream. So long as the received signal is of high quality and can remain locked with the transmitted signal at 136, the sink device 12 operates normally at 140 in the same manner as if the connection to the source device were hardwired.

Loss-of-lock changes the mode of a switch (switch 182) at 144 to establish that the synthesized CTRL 3 signal is used in place of the received CTRL 3. This assures that the source device counter and sink device counter remain synchronized until the wireless receiver 170 of sink wireless interface 104 determines that it is again receiving good quality data and that the received CTRL 3 signals are usable at 148. At this point, the sink wireless interface 104 can switch back to utilizing the received CTRL 3 signal and passing that CTRL 3 signal onto the sink device 12 at 152. CTRL then returns to 136 where signal lock is again monitored to determine whether or not the incoming CTRL 3 signal is usable or whether the synthesized CTRL 3 signal should be used.

Thus, a method consistent with certain embodiments, of processing a received encrypted frame signal, wherein the received encrypted frame signal is indicative that a specific video frame is encrypted, involves receiving a video signal including the received encrypted frame signal; wherein the received video signal comprises a received bit stream; synthesizing the received encrypted frame signal to produce a synthesized encrypted frame signal that is in synchronization with the received encrypted frame signal; determining if a sink wireless receiver is locked to the received bit stream, and if so, passing the received encrypted frame signal to the sink device; and if the sink wireless receiver is not locked to the received bit stream, passing the synthesized encrypted frame signal to the sink device.

Another method consistent with certain embodiments, of processing a received encrypted frame signal, wherein the received encrypted frame signal is indicative that a specific received video frame is encrypted involves receiving a wireless transmission carrying a video signal including the received encrypted frame signal, wherein the received video frame comprises a received bit stream, wherein the encrypted frame signal comprises an HDCP (High-Bandwidth Digital Content Protection) Control 3 signal; synthesizing the received encrypted frame signal to produce a synthesized encrypted frame signal that is in synchronization with the received encrypted frame signal, wherein the synthesizing is carried out by a synthesizer device that has a short acquisition time and has a long hold time with respect to a period of the encrypted frame signal; wherein the synthesizing is carried out using a phase locked loop; determining if a sink wireless receiver is locked to the received bit stream, and if so, passing the received encrypted frame signal to the sink device; and if the sink wireless receiver is not locked to the received bit stream, passing the synthesized encrypted frame signal to the sink device.

Figure 5:
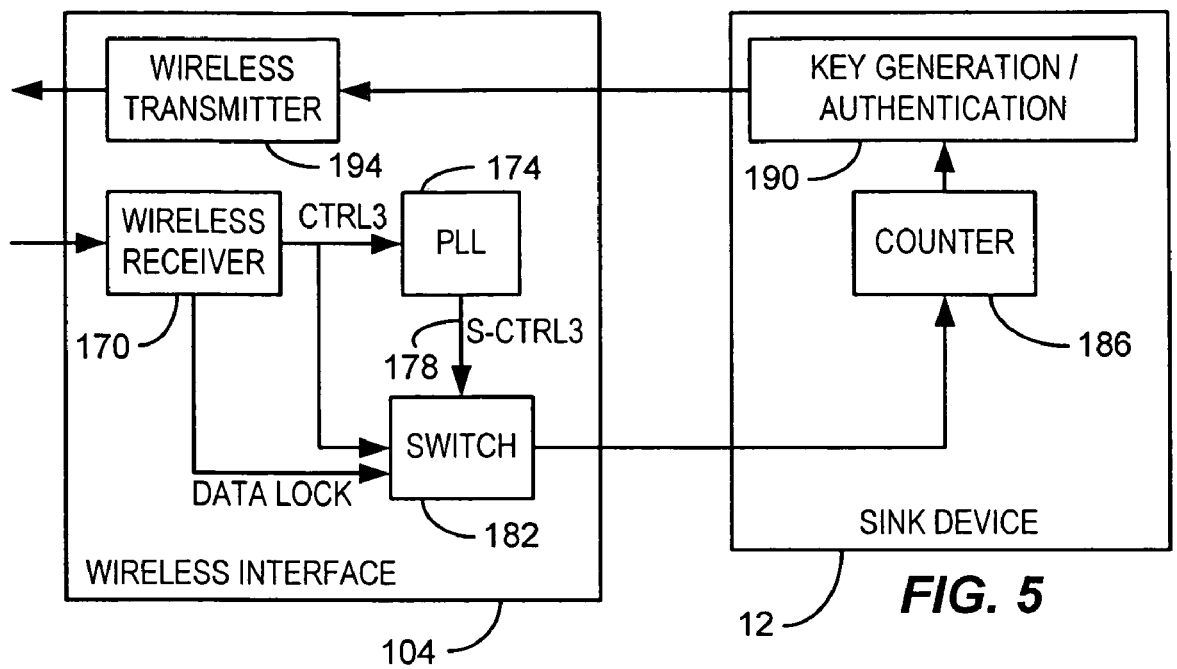
FIG. 5 is a block diagram of a first apparatus consistent with certain embodiments of the present invention.

FIG. 5 depicts a block diagram of the sink wireless interface and sink device suitable for operation as depicted in FIG. 4. The sink wireless interface 104 contains a wireless receiver 170 which receives transmissions from the source wireless interface 100. Wireless receiver 170 also receives other control information and video data which is passed onto sink device 12, but this portion of the operation is not illustrated in FIG. 5 for simplicity. Wireless receiver 170 passes CTRL 3 pulses to phase-locked loop 174 which locks on the CTRL 3 pulses to produce synthesized CTRL 3 pulses at its output 178. Phase-locked loop device 174 should preferably have a fast acquisition time, so that minimal time is required for it to synchronize with the CTRL 3 pulses, but should have a long period of production of free running synthesized CTRL 3 pulses in the event of loss of the CTRL 3 input pulses. This suggests that the phase-locked loop synthesizer have a short acquisition time and a long hold time, with the length of the hold time being measured with respect to a period of the encrypted frame signal.

In one example embodiment, a phase-locked loop (PLL) can be used to generate the synthesized CTRL 3 pulses. When the incoming wireless bit stream is lost or otherwise unlocked, the PLL's phase detector can be disabled to permit the PLL to operate in a free running mode to supply the synthesized CTRL 3 pulses. Thus, the PLL locks to good signals and runs freely when the signal is lost. Other mechanisms to effect continuous synthesis of the CTRL 3 signal during loss of lock will occur to those skilled in the art upon consideration of the present teaching.

The wireless receiver can determine whether or not the incoming wireless bit stream is locked and produce a data lock signal which is used to control the operation of a switch 182 which switches between the CTRL 3 signal and the synthesized CTRL 3 signal in order to pass a continuous stream of pulses to a counter 186 in the sink device. Counter 186, as previously mentioned, is used to generate a new decryption key every time the counter increments and to generate key verification codes and the like for an authentication process. These functions are collectively represented by block 190 of sink device 12. Since source device 10 and sink device 12 are not physically connected together as in the case of wired DVI or HDMI, the key selection values and any other communication needed with the intelligent source device 10 are provided by way of a wireless transmitter 194 of the sink wireless interface 104.

Thus, an apparatus consistent with certain embodiments, for processing a received encrypted frame signal, wherein the received encrypted frame signal is indicative that a specific received video frame is encrypted receives a video signal including the received encrypted frame signal wherein the received video frame comprises a received bit stream. A synthesizer circuit receives the received encrypted frame signal to produce a synthesized encrypted frame signal that is in synchronization with the received encrypted frame signal. A switch that receives a signal indicating whether or not a sink wireless receiver is locked to the received bit stream, wherein the switch passes the received encrypted frame signal to the sink device if the sink wireless receiver is locked to the received bit stream, and wherein the switch passes the synthesized encrypted frame signal to the sink device if the sink wireless receiver is not locked to the received bit stream.

Another apparatus, consistent with certain embodiments, for processing a received encrypted frame signal, wherein the received encrypted frame signal is indicative that a specific video frame is encrypted has a wireless receiver device for receiving a wireless video signal including the received encrypted frame signal, wherein the received video frame comprises a received bit stream, wherein the encrypted frame signal comprises an HDCP (High-Bandwidth Digital Content Protection) Control 3 signal. A synthesizer circuit that receives the received encrypted frame signal to produce a synthesized encrypted frame signal that is in synchronization with the received encrypted frame signal, wherein the encrypted frame signal is synthesized using a phase locked loop having a short acquisition time and having a long hold time with respect to a period of the encrypted frame signal. A switch that receives a signal indicating whether or not a sink wireless receiver is locked to the received bit stream, wherein the switch passes the received encrypted frame signal to the sink device if the sink wireless receiver is locked to the received bit stream, and wherein the switch passes the synthesized encrypted frame signal to the sink device if the sink wireless receiver is not locked to the received bit stream.

Figure 6:
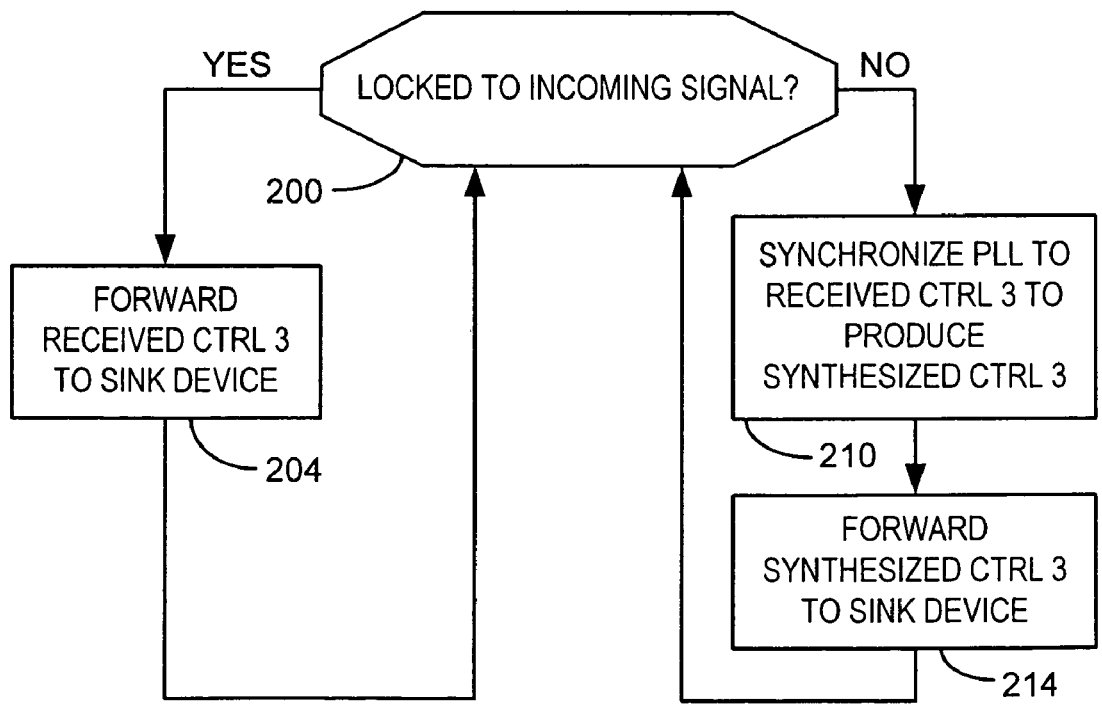
FIG. 6 is a flow chart showing a switch decision mechanism consistent with certain embodiments of the present invention.

FIG. 6 depicts a simplified representation of the decision making process used to control switch 182 of FIG. 5. All decisions are made based upon whether or not the incoming wireless transmission is of such quality that the wireless receiver can consider itself to be locked to the incoming signal at 200. If so, the received CTRL 3 device can be forwarded to the sink device 12 for use thereby. If, on the other hand, the incoming signal is not locked as determined by wireless receiver 170, the synthesized CTRL 3 signal produced at 210 can be forwarded to the sink device at 214 in place of the received CTRL 3 signal, thereby maintaining the synchronization of the source counter in source device 10 and the counter 186 of sink device 12.

Figure 7:
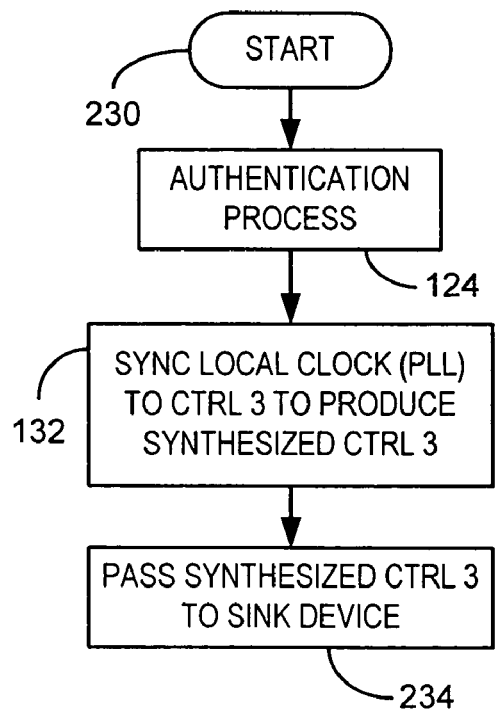
FIG. 7 is a flow chart depicting operation of a second process consistent with certain embodiments of the present invention.

A somewhat simpler implementation may also be possible as depicted in FIG. 7 starting at 230. In this embodiment, an authentication process 124 is carried out in the same manner as in FIG. 4. Similarly, the local clock is synchronized to the incoming CTRL 3 signals at 132 to produce synthesized CTRL 3 signals. These synthesized CTRL 3 signals can then be passed to the sink device at 234 without regard for whether or not incoming bit stream and CTRL 3 data constitutes a locked condition at the wireless receiver of the wireless interface 104.

Thus, a method consistent with certain embodiments, of processing a received encrypted frame signal, wherein the received encrypted frame signal is indicative that a specific video frame is encrypted, involves receiving a video signal including the received encrypted frame signal; wherein the received video frame comprises a received bit stream synthesizing the received encrypted frame signal to produce a synthesized encrypted frame signal that is in synchronization with the received encrypted frame signal; and passing the synthesized encrypted frame signal to the sink device.

Another method, consistent with certain embodiments, of processing a received encrypted frame signal, wherein the received encrypted frame signal is indicative that a specific video frame is encrypted, involves: receiving a wireless transmission comprising a video signal including the received encrypted frame signal; wherein the received video frame comprises a received bit stream; wherein the encrypted frame signal comprises an HDCP (High-Bandwidth Digital Content Protection) Control 3 signal; synthesizing the received encrypted frame signal to produce a synthesized encrypted frame signal that is in synchronization with the received encrypted frame signal, wherein the synthesizing is carried out by a synthesizer device that has a short acquisition time and has a long hold time with respect to a period of the encrypted frame signal; wherein the encrypted frame signal is synthesized using a phase locked loop; and passing the synthesized encrypted frame signal to the sink device.

Figure 8:
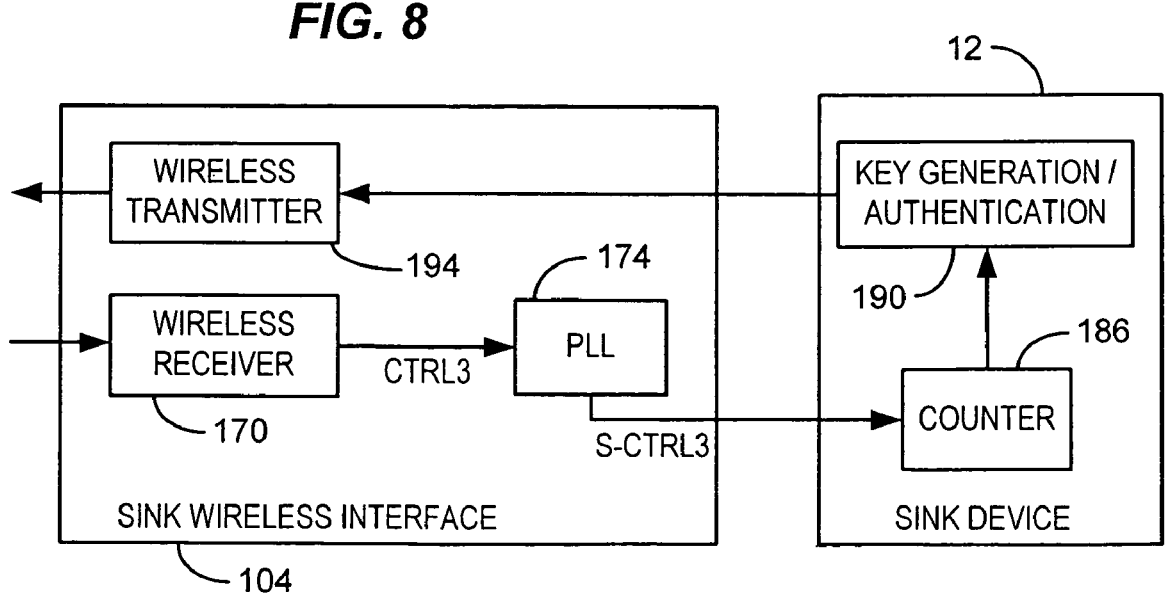
FIG. 8 is a block diagram of a second apparatus consistent with certain embodiments of the present invention.

A second embodiment of a wireless interface 104 is depicted in FIG. 8 coupled to a sink device 12. In this embodiment, a wireless receiver 170 operates in a manner similar to that described in conjunction with FIG. 5 except that there is no use of a data lock signal in conjunction with this aspect of the device's operation. The CTRL 3 signal is passed to phase-locked loop 174 or other clock synthesizer in order to produce synthesized CTRL 3 signals which are always passed to counter 186. In this manner, the counter 186 of sink device 12 is always incremented using the synthesized CTRL 3 signal without regard for the quality of the incoming wireless data.

In the embodiment described above, the CTRL 3 signal of HDCP serves as a signal indicating that a frame is to be encrypted, i.e. an encrypted frame signal. Such a signal is used in DVI and HDMI. For purposes of this document, the term CTRL 3 or encrypted frame signal is equally applicable to HDCP and any other signal that uses a similar signal to increment and synchronize transmitter side and receiver side counters in order to increment encryption and decryption keys.

Thus, an apparatus consistent with certain embodiments, for processing a received encrypted frame signal, wherein the received encrypted frame signal is indicative that a specific video frame is encrypted, wherein the received video frame comprises a received bit stream, has a mechanism for receiving a video signal including the received encrypted frame signal. A synthesizer circuit receives the received encrypted frame signal to produce a synthesized encrypted frame signal that is in synchronization with the received encrypted frame signal, wherein the synthesizer circuit passes the synthesized encrypted frame signal to the sink device.

Another apparatus, consistent with certain embodiments, for processing a received encrypted frame signal, wherein the received encrypted frame signal is indicative that a specific video frame is encrypted has a wireless receiver that receives a wireless video signal including the received encrypted frame signal, wherein the received video frame comprises a received bit stream, wherein the encrypted frame signal comprises an HDCP (High-Bandwidth Digital Content Protection) Control 3. A synthesizer circuit receives the received encrypted frame signal to produce a synthesized encrypted frame signal that is in synchronization with the received encrypted frame signal, wherein the synthesizer comprises a phase locked loop having a short acquisition time and having a long hold time with respect to a period of the encrypted frame signal, and wherein the synthesizer circuit passes the synthesized encrypted frame signal to the sink device.

While certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of processing a received encrypted frame signal, comprising:

wirelessly receiving a video signal at a sink wireless receiver, the video signal including the received encrypted frame signal and a received bit stream;

the received encrypted frame signal being indicative that a specific video frame is encrypted and is further indicative that a decryption key is to be incremented;

synthesizing the received encrypted frame signal to produce a synthesized encrypted frame signal that is in synchronization with the received encrypted frame signal;

determining if the sink wireless receiver is locked to the received encrypted frame signal, and if so, passing the received encrypted frame signal to a sink device; and if the sink wireless receiver is not locked to the received encrypted frame signal, passing the synthesized encrypted frame signal to a sink device.

2. The method according to claim 1, wherein the encrypted frame signal comprises an HDCP (High-Bandwidth Digital Content Protection) Control 3 signal.

3. The method according to claim 1, wherein the encrypted frame signal is synthesized using a phase locked loop.

4. The method according to claim 3, wherein the phase locked loop has a short acquisition time and has a long hold time with respect to a period of the encrypted frame signal.

5. The method according to claim 1, wherein the determining is carried out by receipt of a signal indicative of a prescribed level of quality of the received video signal.

6. A method of processing a received encrypted frame signal, comprising:

receiving a wireless transmission at a sink wireless receiver, the wireless transmission carrying a received video signal including the received encrypted frame signal and a received bit stream;

the encrypted frame signal comprising an HDCP (High-Bandwidth Digital Content Protection) Control 3 signal indicative that a specific video frame is encrypted and is further indicative that a decryption key is to be incremented;

synthesizing the received encrypted frame signal to produce a synthesized encrypted frame signal that is in synchronization with the received encrypted frame signal, wherein the synthesizing is carried out using a phase locked loop by a synthesizer device that has a short acquisition time and has a long hold time with respect to a period of the encrypted frame signal;

determining if the sink wireless receiver is locked to the received encrypted frame signal, and if so, passing the received encrypted frame signal to a sink device; and if the sink wireless receiver is not locked to the received encrypted frame signal, passing the synthesized encrypted frame signal to a sink device.

7. A method of processing a received encrypted frame signal, comprising:

wirelessly receiving a video signal at a sink wireless receiver, the video signal including the received encrypted frame signal and a received bit stream;

the received encrypted frame signal being indicative that a specific video frame is encrypted and is further indicative that a decryption key is to be incremented;

synthesizing the received encrypted frame signal to produce a synthesized encrypted frame signal that is in synchronization with the received encrypted frame signal; and passing the synthesized encrypted frame signal to a sink device.

8. The method according to claim 7, wherein the encrypted frame signal comprises an HDCP (High-Bandwidth Digital Content Protection) Control 3 signal.

9. The method according to claim 7, wherein the encrypted frame signal is synthesized using a phase locked loop.

10. The method according to claim 9, wherein the synthesizer device has a short acquisition time and has a long hold time with respect to a period of the encrypted frame signal.

11. A method of processing a received encrypted frame signal, comprising:

receiving a wireless transmission at a sink wireless receiver, the wireless transmission comprising a video signal including the received encrypted frame signal and a received bit stream;

the encrypted frame signal comprising an HDCP (High-Bandwidth Digital Content Protection) Control 3 signal and wherein the received encrypted frame signal is indicative that a specific video frame is encrypted and is further indicative that a decryption key is to be incremented;

synthesizing the received encrypted frame signal to produce a synthesized encrypted frame signal that is in synchronization with the received encrypted frame signal, wherein the synthesizing is carried out using a phase locked loop by a synthesizer device that has a short acquisition time and has a long hold time with respect to a period of the encrypted frame signal; and passing the synthesized encrypted frame signal to a sink device.

12. An apparatus for processing a received encrypted frame signal, comprising:

means for wirelessly receiving a video signal at a sink wireless receiver, the video signal including the received encrypted frame signal and a received bit stream;

the received encrypted frame signal being indicative that a specific video frame is encrypted and is further indicative that a decryption key is to be incremented;

a synthesizer circuit that receives the received encrypted frame signal to produce a synthesized encrypted frame signal that is in synchronization with the received encrypted frame signal;

a switch that receives a signal indicating whether or not a sink wireless receiver is locked to the received encrypted frame signal;

the switch passing the received encrypted frame signal to a sink device if the sink wireless receiver is locked to the encrypted frame signal; and the switch passing the synthesized encrypted frame signal to a sink device if the sink wireless receiver is not locked to the received encrypted frame signal.

13. The apparatus according to claim 12, wherein the encrypted frame signal comprises an HDCP (High-Bandwidth Digital Content Protection) Control 3 signal.

14. The apparatus according to claim 12, wherein the encrypted frame signal is synthesized using a phase locked loop.

15. The apparatus according to claim 14, wherein the phase locked loop has a short acquisition time and has a long hold time with respect to a period of the encrypted frame signal.

16. The apparatus according to claim 12, wherein the determining is carried out by receipt of a signal indicative of a prescribed level of quality of the received bit stream.

17. An apparatus for processing a received encrypted frame signal, comprising:

a sink wireless receiver device for receiving a wireless video signal, the wireless video signal including the received encrypted frame signal and a received bit stream;

the encrypted frame signal comprising a signal selected from the group consisting of an HDCP (High-Bandwidth Digital Content Protection) Control 3 signal and a HDMI (High Definition Multimedia Interface) Control 3 signal, wherein the Control 3 signal is indicative that a specific video frame is encrypted and is farther indicative that a decryption key is to be incremented;

a synthesizer circuit that receives the received encrypted frame signal to produce a synthesized encrypted frame signal that is in synchronization with the received encrypted frame signal, wherein the encrypted frame signal is synthesized using a phase locked loop having a short acquisition time and having a long hold time with respect to a period of the encrypted frame signal;

a switch that receives a signal indicating whether or not a sink wireless receiver is locked to the received encrypted frame signal;

the switch passing the received encrypted frame signal to a sink device if the sink wireless receiver is locked to the received encrypted frame signal; and the switch passing the synthesized encrypted frame signal to a sink device if the sink wireless receiver is not locked to the received encrypted frame signal.

18. An apparatus for processing a received encrypted frame signal, comprising:

means for wirelessly receiving a video signal at a sink wireless receiver, the video signal including the received encrypted frame signal and a received bit stream;

the received encrypted frame signal being indicative that a specific video frame is encrypted and is further indicative that a decryption key is to be incremented;

a synthesizer circuit that receives the received encrypted frame signal to produce a synthesized encrypted frame signal that is in synchronization with the received encrypted frame signal;

the synthesizer circuit passing the synthesized encrypted frame signal to a sink device.

19. The apparatus according to claim 18, wherein the encrypted frame signal comprises an HDCP (High-Bandwidth Digital Content Protection) Control 3 signal.

20. The apparatus according to claim 18, wherein the encrypted frame signal is synthesized using a phase locked loop.

21. The apparatus according to claim 20, wherein the synthesizer device has a short acquisition time and has a long hold time with respect to a period of the encrypted frame signal.

22. The apparatus according to claim 18, wherein the determining is carried out by receipt of a signal indicative of a prescribed level of quality of the received bit stream.

23. An apparatus for processing a received encrypted frame signal, comprising:

a sink wireless receiver that receives a wireless video signal, the wireless video signal including the received encrypted frame signal;

the encrypted frame signal comprising a signal selected from the group consisting of an HDCP (High-Bandwidth Digital Content Protection) Control 3 signal and a HDMI (High Definition Multimedia Interface) Control 3 signal, and wherein the received encrypted frame signal is indicative that a specific video frame is encrypted and is further indicative that a decryption key is to be incremented;

a synthesizer circuit that receives the received encrypted frame signal to produce a synthesized encrypted frame signal that is in synchronization with the received encrypted frame signal, wherein the synthesizer comprises a phase locked loop having a short acquisition time and having a long hold time with respect to a period of the encrypted frame signal;

a switch that receives a signal indicating whether or not a sink wireless receiver is locked to the received encrypted frame signal;

the synthesizer circuit passing the synthesized encrypted frame signal to a sink device.

* * * * *